(12) United States Patent
Robinson (10) Patent No.: US 9,255,643 B2
(45) Date of Patent: Feb. 9, 2016

(54) INTEGRATED PNEUMATIC VALVE LOCK (75) Inventor: Randy Donald Robinson, Kingsville, MO (US)

(73) Assignee: Delaware Capital Formation, Inc., Wilmington, DE (US)

( * ) Notice: Subject to any disclaimer, the term of this patent is extended or adjusted under 35 U.S.C. 154(b) by 782 days.

(21) Appl. No.: 13/557,723

(22) Filed: Jul. 25, 2012

(65) Prior Publication Data

US 2013/0025705 A1 Jan. 31, 2013

Related U.S. Application Data (60) Provisional application No. 61/511,391, filed on Jul. 25, 2011.

(51) Int. Cl.
F16K 35/00 (2006.01)
F16K 1/12 (2006.01)
F16K 35/02 (2006.01)

(52) U.S. Cl.
CPC ............ *F16K 1/12* (2013.01); *F16K 35/022* (2013.01); *Y10T 137/6065* (2015.04)

(58) Field of Classification Search
CPC ......... F16K 1/12; F16K 35/022; F16K 35/02; Y10T 137/6065
USPC .............. 251/94, 95, 98, 99, 90, 91; 137/383
See application file for complete search history.

(56) References Cited

U.S. PATENT DOCUMENTS

| 2,061,608 A | 11/1936 | Beckwith |
| 2,072,314 A | 3/1937 | Rhodes |
| 2,875,616 A | 3/1959 | Marks |
| 3,051,433 A * | 8/1962 | Dale et al. ............. 251/61.5 |
| 3,369,476 A | 2/1968 | Seiz |
| 3,662,793 A | 5/1972 | Calisher |
| 4,706,929 A | 11/1987 | Kalaskie |
| 4,763,690 A | 8/1988 | Martin |
| 4,831,973 A | 5/1989 | Richeson |
| 4,838,306 A | 6/1989 | Horn |
| 4,848,388 A | 7/1989 | Waldbusser |
| 5,067,510 A | 11/1991 | Breaux |
| 5,067,519 A | 11/1991 | Russell |
| 5,113,891 A | 5/1992 | Carney |
| 5,188,335 A | 2/1993 | Pettinaroli |
| 5,190,070 A | 3/1993 | Robinson |
| 5,193,580 A | 3/1993 | Wass |

(Continued)

FOREIGN PATENT DOCUMENTS

WO WO01065120 9/2001

*Primary Examiner* — John Bastianelli
*Assistant Examiner* — Andrew J Rost
(74) *Attorney, Agent, or Firm* — Spencer Fane LLP (57) ABSTRACT

A pneumatic lock assembly for securing a valve comprises a lock pin engaging a contact surface on a poppet assembly. The head of a poppet creates a sealing relationship with an end of the valve. A guide with a bore extends between the exterior and interior of the valve terminating at a sleeve. The sleeve slidably receives a stem extending from the poppet head. A spring biases a pin, slidably received within the pylon bore, into engagement with a contact surface on the valve stem for securing the valve head in a closed position. The pin may be pneumatically disengaged from the groove by forcing air from a pneumatic power source into a bore in the pin. A cap assembly at the exterior of the valve provides protection for the lock assembly and allows for manual disengagement of the pin from the groove.

15 Claims, 8 Drawing Sheets

(56) References Cited

U.S. PATENT DOCUMENTS

| | | |
|---|---|---|
| 5,341,844 A | 8/1994 | Wass |
| 5,363,879 A | 11/1994 | Rhoades |
| 5,365,828 A * | 11/1994 | Sperber et al. .................... 91/41 |
| 6,131,878 A * | 10/2000 | Horstmann .................... 251/94 |
| 6,202,671 B1 * | 3/2001 | Horstmann .................. 137/219 |
| 6,652,212 B2 * | 11/2003 | Kimoto et al. ............... 414/217 |
| 7,083,157 B2 | 8/2006 | Kingsford |
| 7,360,554 B2 | 4/2008 | Huetinck |
| 7,509,972 B2 | 3/2009 | Nesbitt |
| 7,540,468 B2 | 6/2009 | Dixon |
| 2004/0118453 A1 * | 6/2004 | Staranchuk .................. 137/312 |
| 2005/0000570 A1 | 1/2005 | Mohammed |
| 2009/0184272 A1 | 7/2009 | Nesbitt |
| 2010/0090143 A1 | 4/2010 | Kot |
| 2010/0218963 A1 | 9/2010 | Zellweger |

\* cited by examiner

INTEGRATED PNEUMATIC VALVE LOCK

CROSS-REFERENCE TO RELATED APPLICATION

This application claims priority in U.S. Provisional Application No. 61/511,391, filed Jul. 25, 2011, the contents of which are hereby incorporated herein by reference.

BACKGROUND

The present disclosed subject matter relates generally to locking mechanisms, and particularly to a pneumatic lock for a valve.

Bulk materials are often loaded and unloaded from a transport container, such as a tanker trailer, using a bottom loading adapter. The adapter contains a valve, and allows for a conduit, such as a hose, to connect to the transport container for transferring the material to and from the transport container. The materials involved may be relatively inert, caustic, or under high pressure. In addition, the material or environment may be of greatly different or extreme temperatures further complicating handling of the material and operation of the adapter and valve. Therefore, the design of the valve, and the materials used in construction and operation of the valve should accommodate varying materials and operating conditions.

Passage of the material through the adapter is controlled by a valve accessible at the exterior of the container. The easy accessibility of the valve lends them to unauthorized access and release of material from the transport container. Systems and methods for limiting access to the valves have been developed; however, their effectiveness is limited because they are difficult to use and may not be easily bypassed in an emergency to transfer the liquid material from the transport container.

SUMMARY

A pneumatic lock assembly for securing a valve comprises a lock stem engaging a contact surface on a valve assembly. The head of a poppet creates a sealed relationship with an end of the valve. A guide with a bore extends between the exterior and interior of the valve terminating at a sleeve. The sleeve slidably receives a stem extending from the poppet head. A spring biases a lock pin slidably received within the guide bore into engagement with a contact surface on the valve stem for securing the valve head in a closed position. The lock pin may be pneumatically disengaged from the groove by forcing air from a pneumatic power source into a bore in the lock pin. A cap assembly at the exterior of the valve provides protection for the lock assembly and allows for manual disengagement of the lock pin from the groove.

An embodiment of the pneumatic lock assembly includes a contact surface that is part of a groove integral to the stem. In another embodiment of the pneumatic lock assembly the groove is created by the space between an insert threaded into the end of the stem and the end of the stem. In another embodiment of the pneumatic lock assembly the groove is created by the space between an insert threaded into the end of a stem and an adjusting nut located on the stem of the insert.

BRIEF DESCRIPTION OF THE DRAWINGS

The drawings constitute a part of this specification and include exemplary embodiments of the disclosed subject matter and illustrate various objects and features thereof.

DETAILED DESCRIPTION

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Referring to the drawings, FIGS. 1-5 show an embodiment of a lock assembly 102 embodying principles of the disclosed subject matter integrated into a valve 202. The valve 202 generally comprises a body assembly 204 and a poppet assembly 238. A poppet is a mushroom-shaped valve having a disk-shaped sealing member or head connected to an elongated stem. The head seats against a circular port. While the lock assembly 102 is shown in use with a poppet-type valve 202, those skilled in the art will appreciate that the lock assembly 102 may be used with other types of valves that have an apparatus that permits, regulates, or prevents movement of material through an aperture whereby the lock assembly 102 can engage the sealing member to prevent movement of the sealing member and can disengage the sealing member to permit movement of the sealing member. The body assembly 204 comprises a nose 205 at a proximal end for connecting to a conduit, and a head 206 at a distal end for connecting the valve 101 to a conduit or a container. In an embodiment, the body assembly 204 and poppet assembly 238 are manufactured from metal including aluminum. The head 240 of the poppet valve assembly 238 is located at the nose 205 of the valve 202 and seals the circular opening or port preventing movement of material through the valve 202. Actuation of a handle 216 located on the exterior of the valve 202 moves the head 240 between a sealed position and an unsealed position, and the valve 202 between a closed and open position, respectively. The lock assembly 102 interfaces with the poppet assembly 238 to either permit or prevent movement of the head 240 from the sealed position.

The handle 216 mechanically connects with the poppet assembly 238 through a shaft 221 and attached mechanical linkage. In an embodiment, the handle is manufactured from metal including aluminum. Rotating the handle 216 at the exterior of the valve 202 rotates an arm 222 connected to the shaft 221 at the interior of the valve 202. The arm 222 is mechanically connected to the shaft 221 at a first end and a poppet link 224 at a second end. The poppet link 224 is connected to the arm 222 at a first end and to the stem 242 of the poppet assembly 238 at a second end. Therefore, rotating the handle 216 about the shaft 221 moves the head 240 between a sealed position and an unsealed position. The valve 202 is secured in an open position by placing the catch 218 of the handle 216 around the stop pin 220. The valve 202 is secured in a closed position by engaging the lock assembly 102 with a contact surface located on the valve assembly 238. In an embodiment, the shaft 221, arm 222, and poppet link 224 are manufactured from metal including stainless steel.

Figure 4:
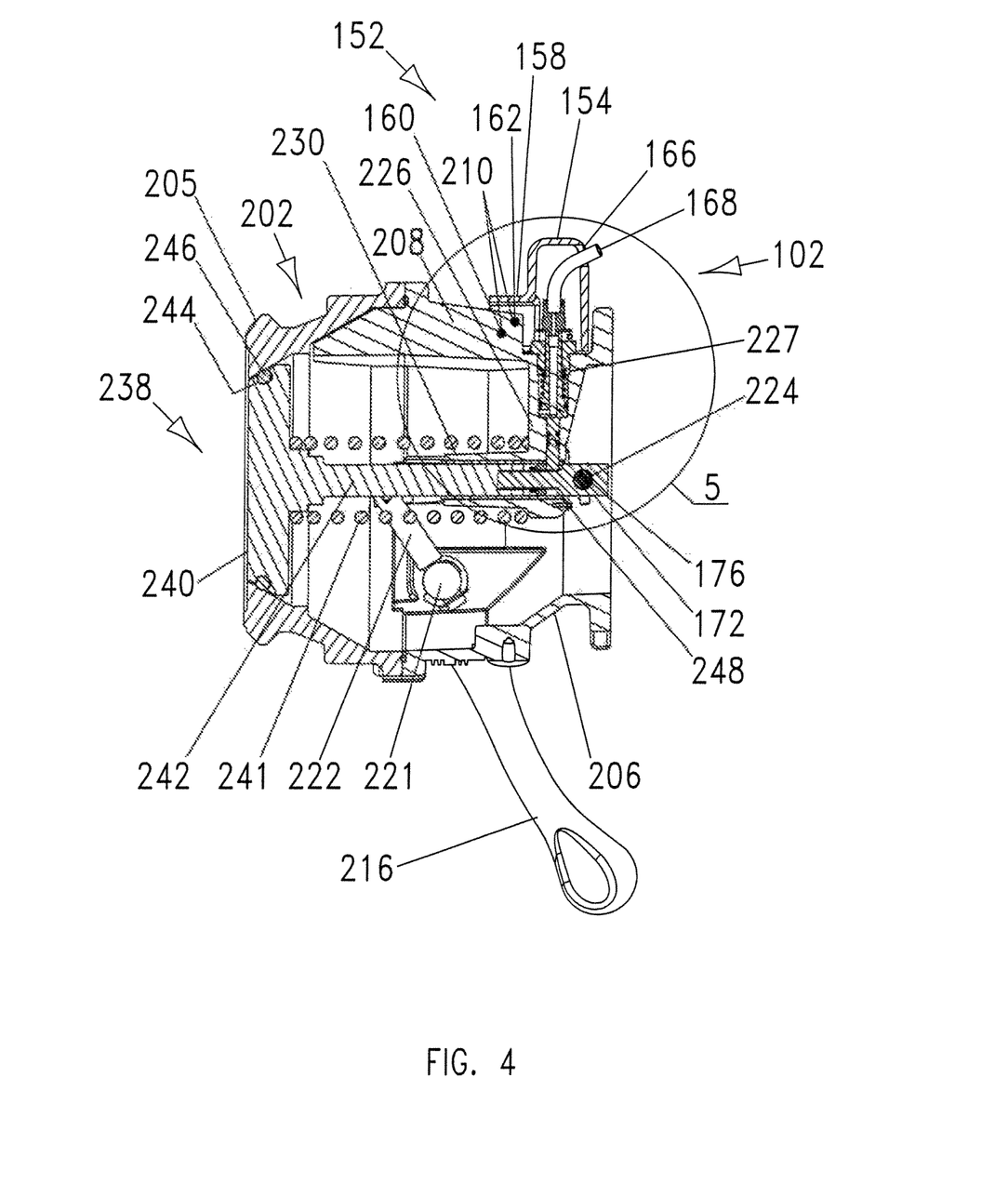
FIG. 4 is a cross section view of the valve and integrated valve lock taken generally along line 4-4 in FIG. 3.

Referring to FIG. 4, a cross-section of the valve 202 is shown illustrating the features of the poppet assembly 238 and lock assembly 102 whereby the poppet assembly 238 is shown in a sealed position. O-rings 246 are disposed within a circumferential groove 244 at the head 240 to create a sealing relationship between the nose 205 and head 240. The poppet assembly 288 is supported within the body assembly 204 by a guide. The guide comprises a support member and a sleeve 230. In an embodiment, the support member is a pylon 226. The stem 242 extends longitudinally into the body assembly 204, and is slidably received within a bearing 234 disposed within a bore 232 of the sleeve 230. In an embodiment, the stem 242 and the inner surface of the bearing 234 have a circular cross-section. In an alternative embodiment, the stem 242 has a non-circular cross-section and the interior surface of the bearing 234 has a complimentary cross-section. The sleeve 230 has an elongated body extending between a proximal end and a distal end, and the body is coaxially aligned with the stem 242. The sleeve 230 is supported within the valve 202 by the pylon 226 that extends from the valve 202 body. A biasing member 241, such as a spring, band, or other structure that provides biasing characteristics, biases the head into a sealing relationship with the nose 205. The pylon 226 has a bore 227 for receiving the lock pin 104 and extends between a first port 231 at the exterior of the head 206 and a second port 233 communicating with the bore 232 in the sleeve 230. In an embodiment, the interior surface of the bore 227 and the pin 104 have a circular cross-section. In an alternative embodiment, the interior surface of the bore 227 has a non-circular cross-section and the pin 104 has a complimentary cross-section. The bearing 234 has a bore 236 for permitting passage of the lock pin 104 into the sleeve 230.

The contact surface may be part of a groove in the stem 242. The groove may have a proximal contact surface and a distal contact surface. In an embodiment, the groove is integral to the stem 242. In another embodiment, the groove is created by the space between an insert 172 threaded into the end 250 of the stem 242, and the end 250 of the stem 242, where the end of the stem 242 is the proximal contact surface. In another embodiment, the groove 248 is created by the space between an insert 172 and an adjusting nut 182 located on the stem 242 of the insert 172, where the distal end of the nut 182 is the proximal contact surface. In the embodiment shown in FIG. 5, the stem 242 and insert 172 have a circular cross-section, and the groove 248 is a circumferential groove.

Figure 5:
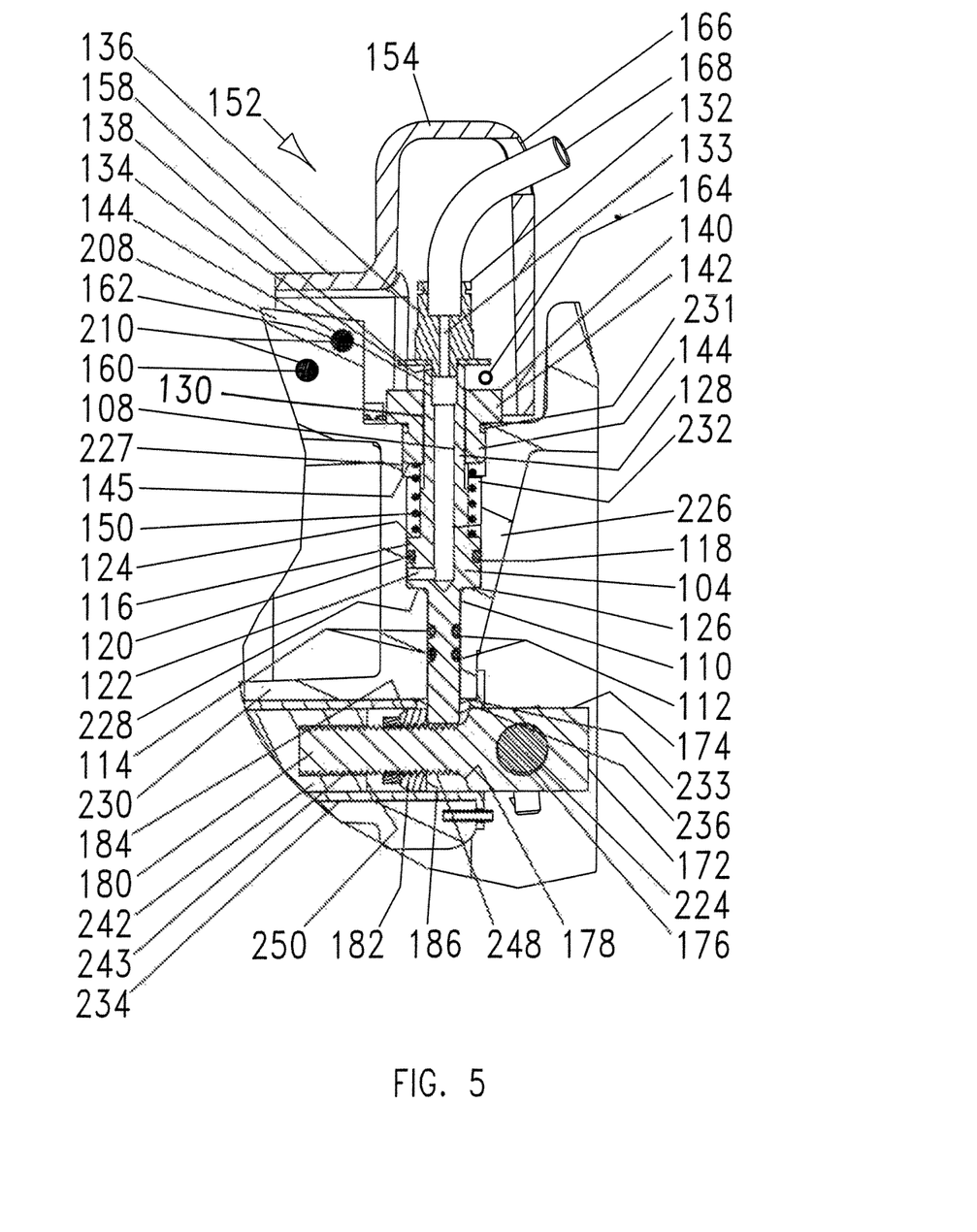
FIG. 5 is an enlarged view of the integrated valve lock taken generally within circle 5 in FIG. 4.

Referring to FIG. 5, the lock assembly 102 is shown engaging a groove 248 created by the space between an insert 172 and an adjusting nut 182, thereby securing the poppet valve assembly 238 in a closed position. The head 174 of the insert 172 has a bore 176 for receiving the second end of the poppet link 224. The groove 248 is created by the space between the head 174 and adjusting nut 182 whereby the adjusting nut 182 has a proximal contact surface 186 and the insert has a distal contact surface 178. The body 180 of the insert 172 is threadably received within a recess 243 at the end 250 of the stem 242. The adjusting nut 182 is threadably received on the body 180 and may be moved forward or rearward to change the position of the proximal contact surface 186. In an embodiment, the insert 172 and adjusting nut 182 are manufactured from metal including stainless steel. When the valve 202 is in a closed position the head 240 is in a sealing relationship, and the groove 248 is accessible by the lock pin 104. The lock pin 104 engages the first contact surface 186 preventing the head 240 from moving into an unsealed position. The sealing relationship between the head 240 and nose 205 may be adjusted by one or more of rotating the stem 242 about the body 180, or moving the first contact surface 186 laterally along the insert 172 by rotating the adjusting nut 182 about the body 180.

Figure 1:
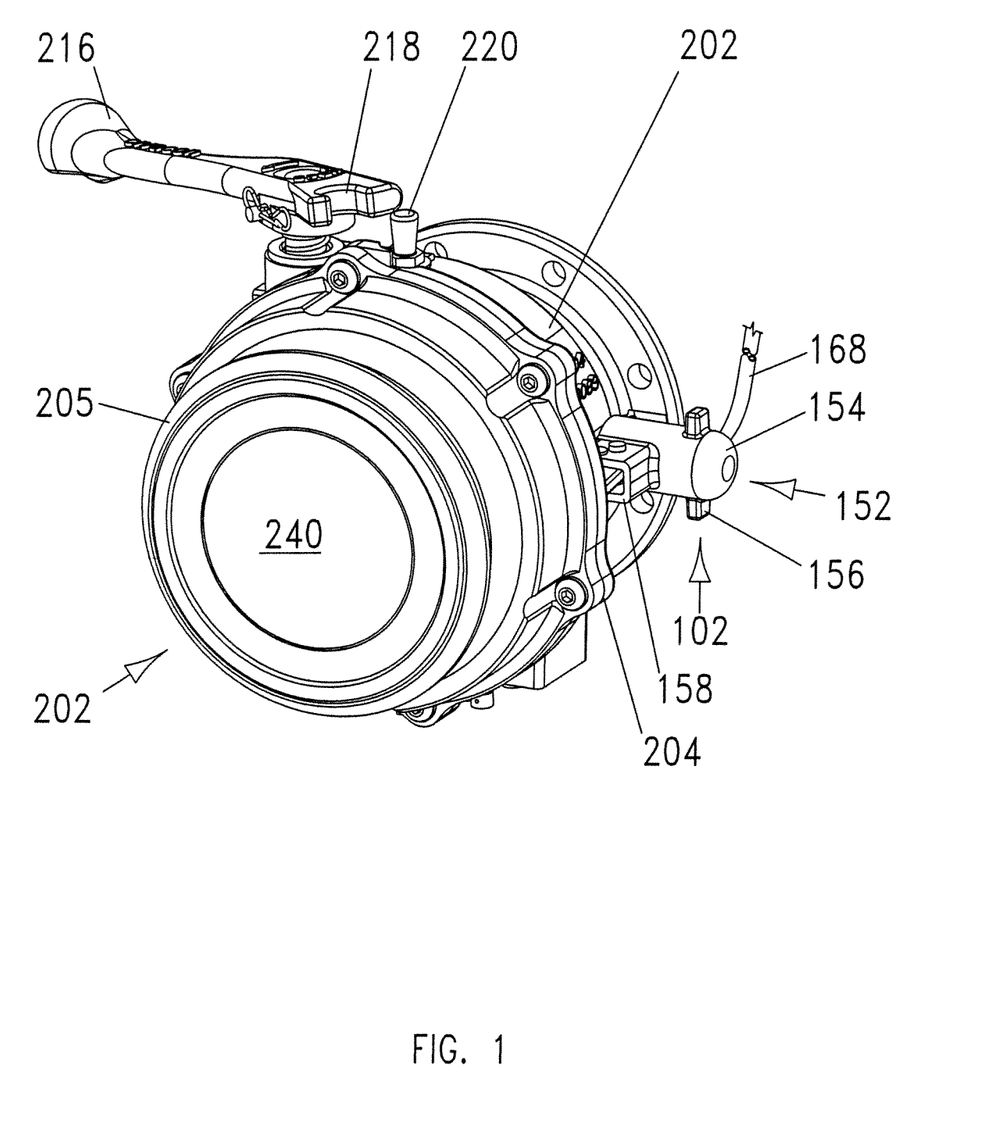
FIG. 1 is an isometric view of the proximal end of a valve showing the valve with an integrated valve lock embodying principles of the disclosed subject matter.
Figure 2:
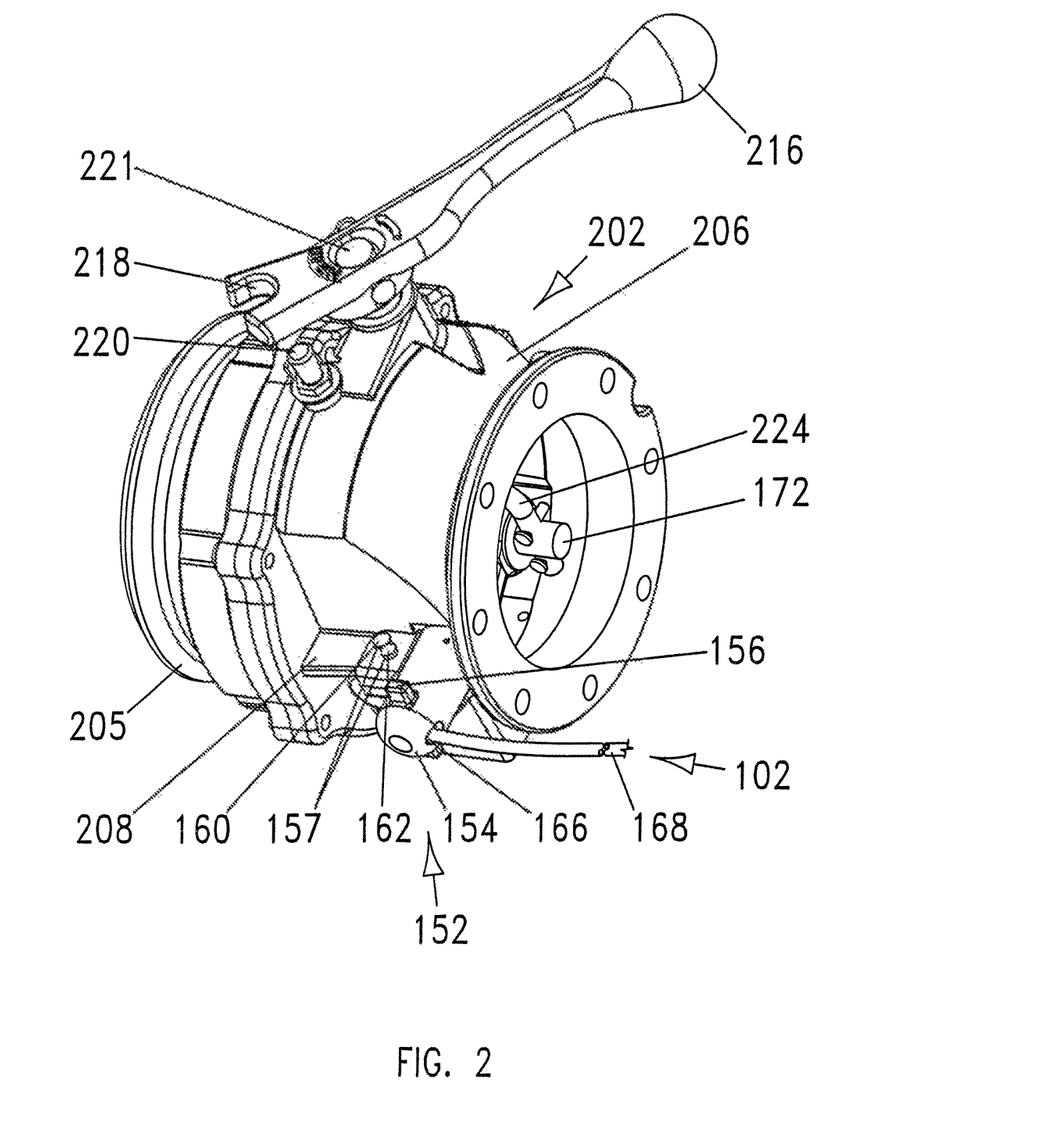
FIG. 2 is an isometric view of the distal end of a valve showing the valve with the integrated valve lock according to one or more embodiments of the disclosed subject matter.
Figure 3:
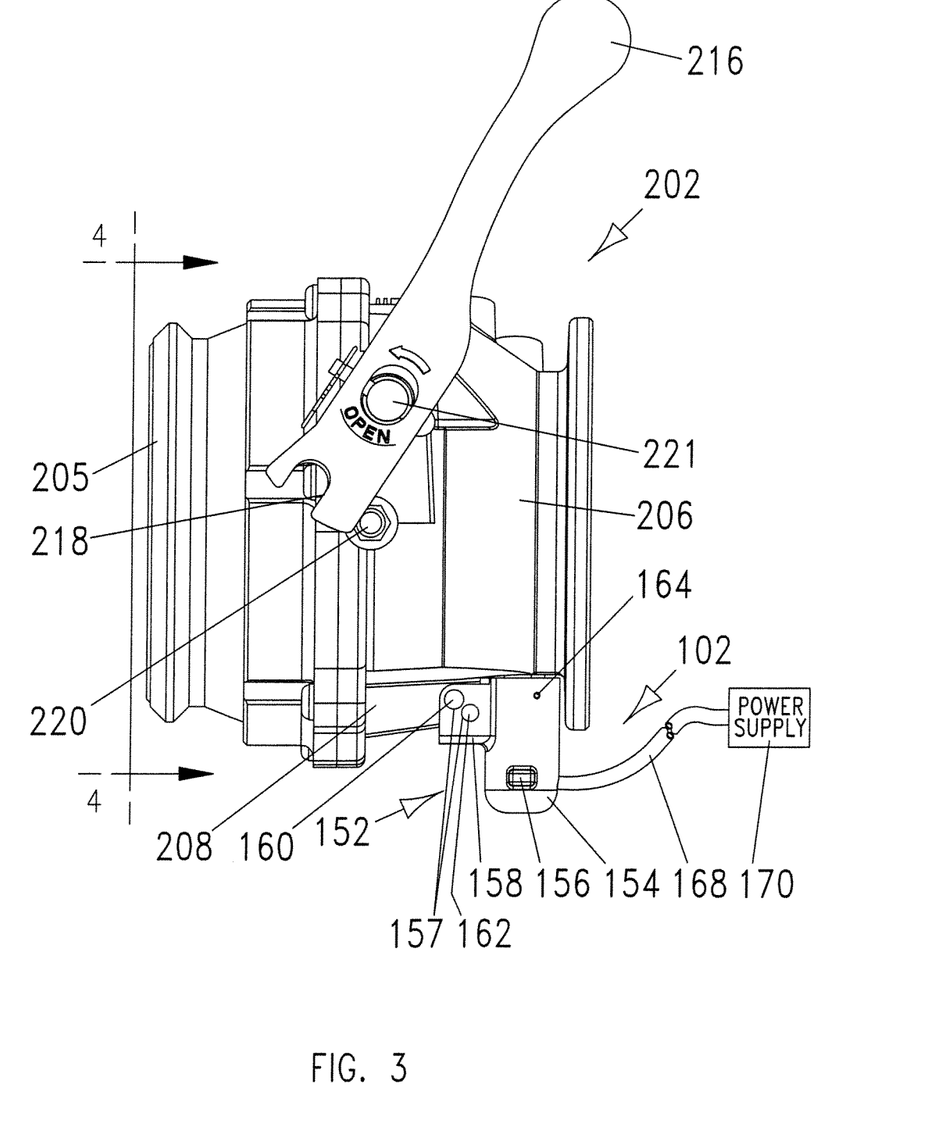
FIG. 3 is a top view of a valve with the integrated valve lock according to one or more embodiments of the disclosed subject matter where the lock is shown in an engaged position.

The lock assembly 102 generally comprises a lock pin 104 slidably received within the bore 227 of the pylon 226, and a cap assembly 152. In an embodiment, the lock pin 104 is manufactured from metal including stainless steel, and is biased downward into an engaged position by a biasing force including a spring 150, and moved into a disengaged position by an opposing force including: a mechanical force including hydraulics powered by a hydraulic power source, or a pneumatic over hydraulic powered by a hydraulic or pneumatic power source; or an electromechanical force including a solenoid powered by a electrical power source. In an embodiment, the lock pin 104 is moved into a disengaged position pneumatically by air provided by a pneumatic power source, represented by pneumatic power source 170 (FIG. 3). The lock pin 104 has a lower pin portion 110, a middle pin portion 116, and an upper pin portion 128. The lower pin portion 110 has one or more O-rings 114 disposed within one or more circumferential grooves 112 for creating a sealing relationship between the interior of the valve 202 and the bore 227. The middle pin portion 116 has a spring seat 124 at an upper end, a port 122 at a lower end, and an O-ring 120 received within a circumferential groove 118 in-between. The upper pin portion 128 extends through a retainer nut 140, and has a bore 108 for connecting the port 122 with a pneumatic line 168. The retainer nut 140 has a longitudinal passage 130 extending between a head 142 and neck 144 for slidably receiving the upper pin portion 128. The retainer nut 140 is threadably received within the bore 227 of the pylon 226 providing a surface 145 for biasing the spring 150. The pneumatic line 168 is connected to the lock pin 104 by a cap 132. The cap 132 has a bore 133 communicating between the pneumatic line 168 and the passage 130. In an embodiment, the bore 133 has a circular cross-section. In an alternative embodiment, the bore 133 cross-section compliments the cross-section of the pin 104. The neck 134 of the cap 132 is threadably received within the upper pin portion 128, and secures a washer 138 thereto. In an alternative embodiment, the pneumatic lien 168 connects directly to the upper pin portion 128, and a flange connected to the upper pin portion 128 extends from the upper pin portion 128 instead of a washer.

Figure 6:
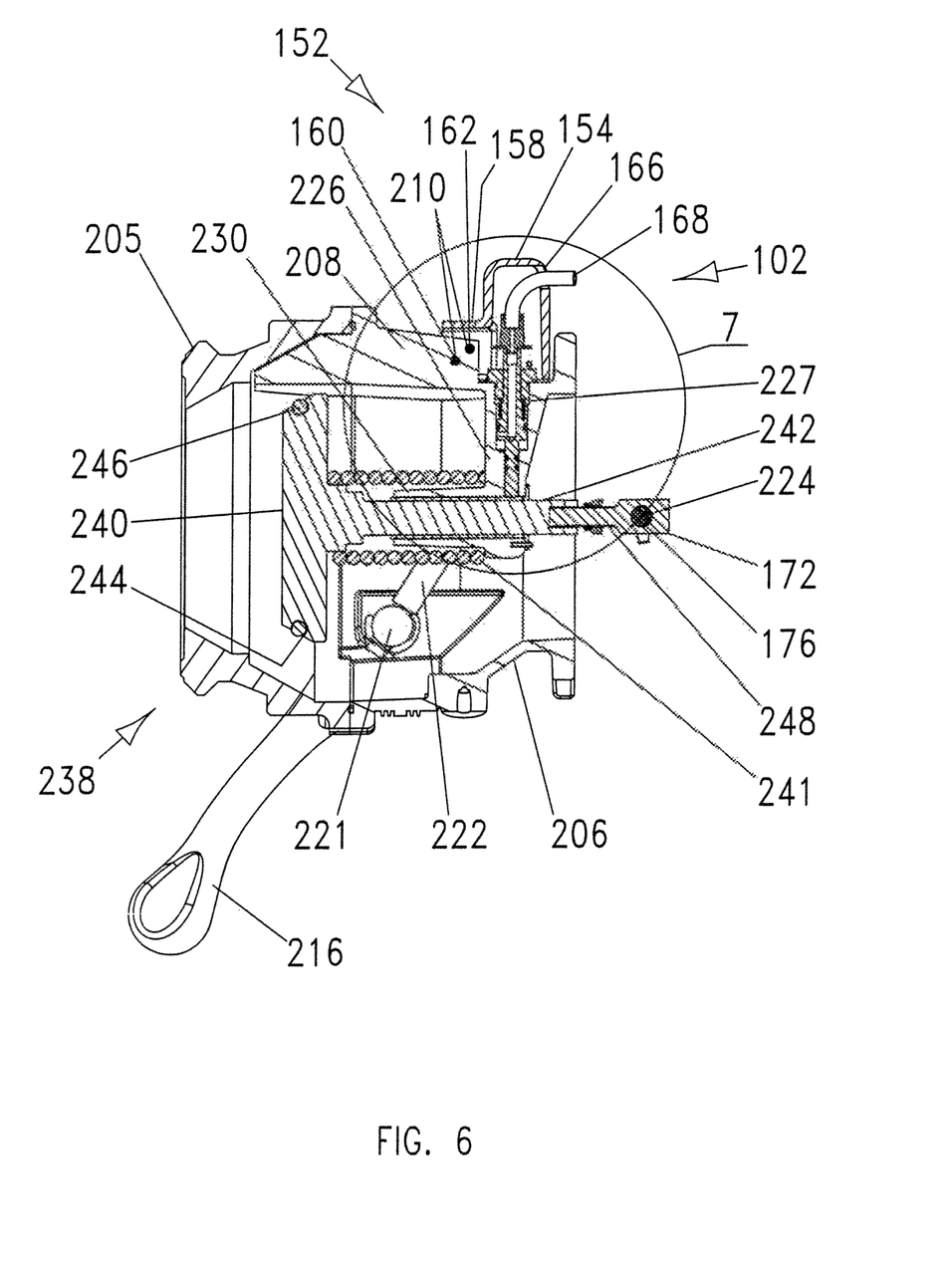
FIG. 6 is a cross-section view of the valve and integrated valve lock where the lock is shown in a disengaged position.
Figure 7:
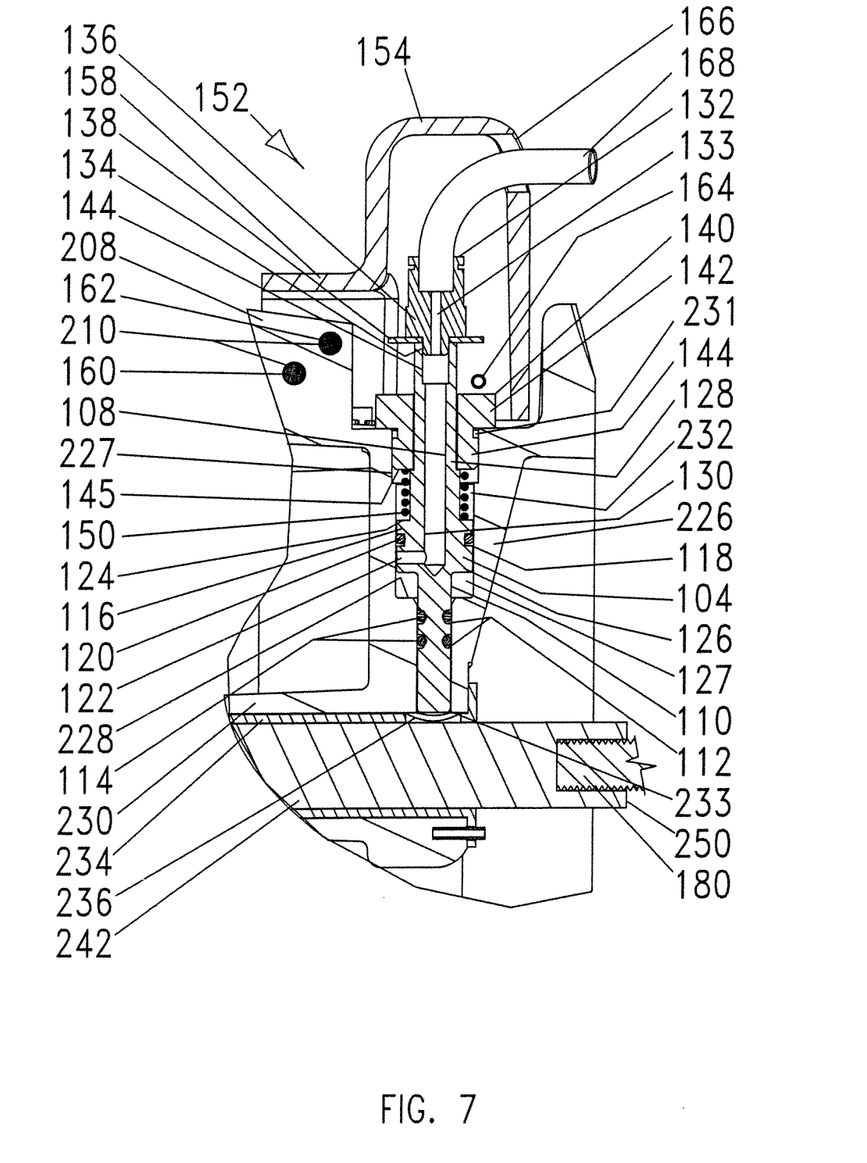
FIG. 7 is an enlarged view of the integrated valve lock taken generally within circle 7 in FIG. 6.

Referring to FIGS. 6-7, a cross-section of the valve 202 is shown whereby the poppet assembly 238 is in an open position. The lock assembly 102 is shown disengaged from the proximal contact surface 186 thereby allowing the poppet assembly 238 to move into an unsealed position and permit material to flow through the valve 202. The lock assembly 102 is mechanically disengaged from the groove 248 by forcing air from the pneumatic power source 170 into a bore 108 in the lock pin 104. The bore 108 extends from the top of the lock pin 104 through the upper pin portion 128 and terminates in the middle pin portion 116. Air entering the lock pin 104 exits the bore 108 through a port 122 open to the bore 108 at an interior opening and open to the bore 227. Air exiting the port 122 into the bore 227 is retained within the bore 227 by O-rings 114 and 120 creating first and second seals. The air accumulates within a gap 127 between a hip 126 of the lock pin 104 and a ledge 228 within the bore 227, causing a mechanical biasing of the lock pin 104 upward against the spring 150.

Figure 8:
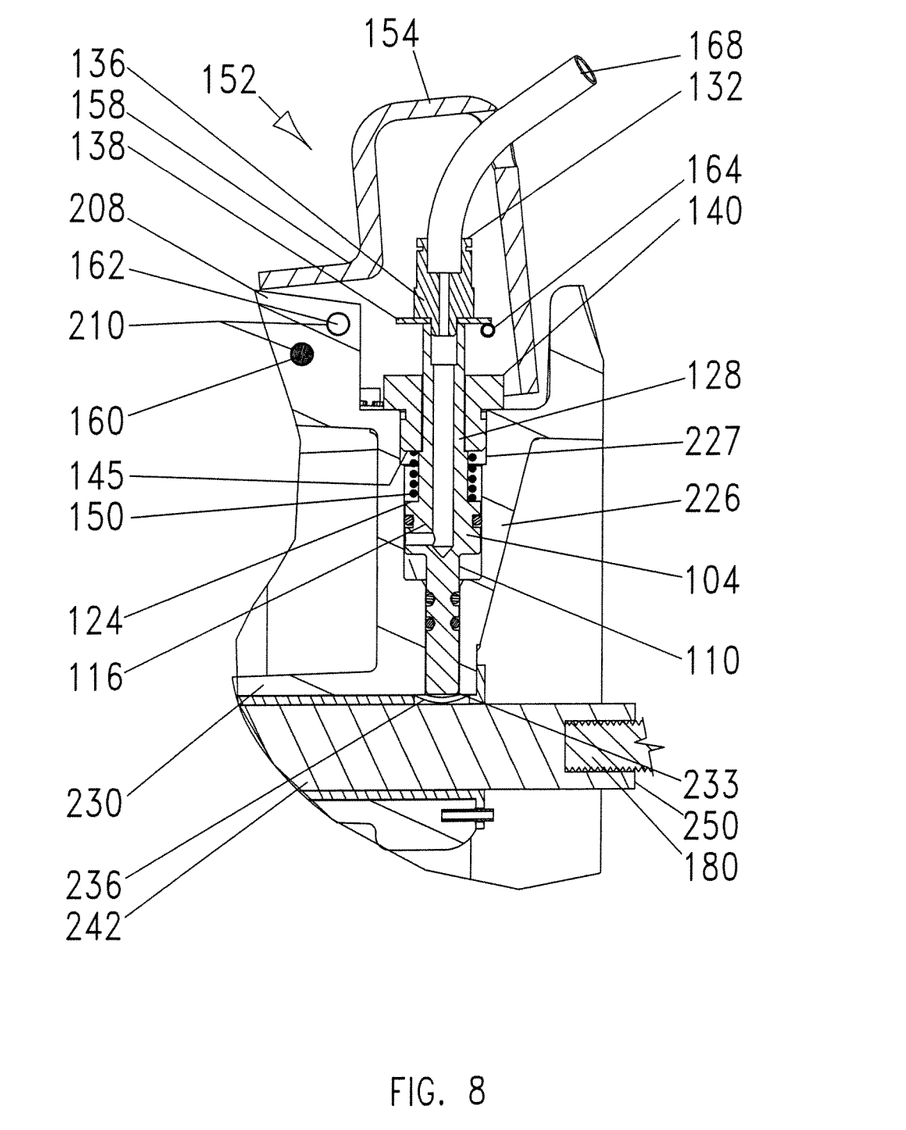
FIG. 8 is a cross section view of the valve and integrated valve lock shown in FIG. 7 where the lock is shown manually disengaged.

The cap assembly 152 provides protection for the lock assembly 102 and allows for manual disengagement of the lock pin 104 from the groove 248. The cap assembly 152 is pivotally attached to a fin 208 on the outside of the body assembly 204 and is disposed at the upper portion 128 of the lock pin 104. The cap assembly 152 may be manufactured from a resilient material including metal or plastic, and comprises a hood 154 and a laterally extending skirt 158. The skirt 158 attaches to the fin 208 by a pivot pin 160 extending through the skirt 158, and a bore 210 in the fin 208. An aperture 166 in the hood 154 permits the pneumatic line 168 to exit the cap assembly 152. The cap assembly 152 has a removable safety pin 162 for securing the cap assembly 152 to the fin 208, and preventing the cap assembly 152 from pivoting about the pivot pin 160. The safety pin 162 provides an indication of unauthorized access, and may be removed in an emergency to allow manual disengagement of the lock pin 104 from the groove 248. Referring to FIG. 8, manual disengagement of the lock pin 104 is accomplished by pivoting the cap assembly 152 about the pivot pin 160 and biasing a bar 164 within the hood 154 against the washer 138 thereby drawing the lock pin 104 out of engagement with the groove 248, and permitting actuation of the handle 216 and opening of the valve 202. Tabs 156 extending from the hood 154 aid in manually actuating the cap assembly 152.

An alternative embodiment lock assembly 102 includes a position sensor that monitors the position of the lock pin 104, and detects whether the lock pin 104 is engaging the groove 248 or not engaging the groove 248. The position sensor transmits the position signal to a microprocessor including a memory unit, or to a monitoring system having a visual indication including a light, enabling an operator to log the movement of the lock pin 104 and determine the condition of the lock assembly 102.

Although the invention has been disclosed with reference to various particular embodiments, it is understood that equivalents may be employed and substitutions made herein without departing from the scope of the invention as recited in the claims.

Having thus described the disclosed subject matter, what is claimed is:

1. A valve comprising:
    a valve assembly, comprising:
        a valve body including an exterior and an interior, and extending between a proximal end and a distal end;
        a guide extending from the valve body into the interior of the valve body and terminating at an elongated sleeve;
        wherein the sleeve extends between a proximal end and a distal end;
        a longitudinal bore within the sleeve extending between the proximal end and the distal end;
        a longitudinal bore within the guide extending between a first port at the valve body exterior and a second port at the sleeve bore;
        a sealing member for sealing the proximal end of the valve body;
        an elongated stem extending between a proximal end and a distal end, wherein the proximal end is connected to the sealing member and the distal end includes a contact surface;
        wherein the distal end of the stem is received within the sleeve bore;
    a lock assembly, comprising:
        a lock pin disposed within the guide bore;
        a spring for biasing the pin into engagement with the contact surface;
        a cap disposed over an upper portion of the lock pin, wherein the cap is pivotally attached to the exterior of the valve body by a pivot pin;
        a bar disposed within the cap for biasing against the lock pin; and
        a releasable safety pin passing through the cap and valve body for preventing the cap from pivoting; and
        wherein the cap is pivoted away from the valve body to engage the bar with the lock pin to bias the lock pin against the spring and out of engagement with the groove.

2. The valve of claim 1, wherein the contact surface is the end of the stem.

3. The valve of claim 2, further comprising an insert including a threaded body and a head, wherein the body is threadably received within the distal end of the stem.

4. The valve of claim 1, further comprising:
    an insert including a threaded body and a head, wherein the body is threadably received within the distal end of the stem;
    a nut threadably mounted on the insert body; and
    wherein the contact surface is a distal end of the nut.

5. The valve of claim 1, wherein the lock pin is biased out of engagement with the contact surface by a pneumatic force.

6. The valve of claim 1, further comprising a releasable safety pin passing through the cap and valve body securing the cap to the valve body for preventing the cap from pivoting.

7. The valve of claim 1, wherein:
    the valve body proximal end includes a circular opening; and
    the sealing member is disk-shaped for creating a sealing relationship with the circular opening.

8. The valve of claim 1, further comprising:
    wherein the lock pin includes a lower pin portion, a middle pin portion, and an upper pin portion;
    a lock pin bore extending between the top of the lock pin through the upper portion, and terminating within the middle pin portion;
    a port extending between the lock pin bore and the exterior of the middle pin portion;
    a first seal above the port creating a sealing relationship between the lock pin and the guide bore;
    a second seal below the port for creating a sealing relationship between the lock pin and guide bore;
    a gap bound between the first seal, second seal, lock pin, and guide bore, wherein the gap retains air passing through the lock pin bore and port; and wherein air forced into the gap biases the lock pin against the spring and out of engagement with the groove.

9. The valve of claim 8, further comprising:
a nut for retaining the lock pin within the guide bore, the nut comprising:
   a head;
   a neck threadably received within the guide port for retaining the spring; and
   a passage within the nut extending between the head and the neck for slidably receiving the upper pin portion.

10. A valve comprising:
a valve assembly, comprising:
   a valve body including an exterior and an interior, and extending between a proximal end and a distal end;
   a guide extending from the valve body into the interior of the valve body and terminating at an elongated sleeve;
   wherein the sleeve extends between a proximal end and a distal end;
   a longitudinal bore within the sleeve extending between the proximal end and the distal end;
   a longitudinal bore within the guide extending between a first port at the valve body exterior and a second port at the sleeve bore;
   a sealing member for sealing the proximal end of the valve body;
   an elongated stem extending between a proximal end and a distal end, wherein the proximal end is connected to the sealing member and the distal end includes a contact surface;
   wherein the distal end of the stem is received within the sleeve bore;
a lock assembly, comprising:
   a lock pin disposed within the guide bore, comprising:
a lower pin portion;
a middle pin portion;
an upper pin portion;
a lock pin bore extending between the top of the lock pin through the upper portion, terminating within the middle pin portion;
a port extending between the lock pin bore and the exterior of the middle pin portion;
   a first seal disposed above the port for creating a sealing relationship between the lock pin and the guide bore;
   a second seal disposed below the port for creating a sealing relationship between the lock pin and the guide bore; and
   a spring for biasing the pin into engagement with the contact surface.

11. The valve of claim 10, further comprising:
a nut for retaining the lock pin within the guide bore, the nut comprising:
   a head;
   a neck threadably received within the guide port for retaining the spring; and
   a passage within the nut extending between the head and the neck for slidably receiving the upper pin portion.

12. The valve of claim 11, further comprising:
a flange extending from the upper pin portion;
a cap disposed over an upper portion of the lock pin, wherein the cap is pivotally attached to the exterior of the valve body by a pivot pin;
a bar disposed within the cap for biasing against the flange;

a releasable safety pin passing through the cap and valve body for preventing the cap from pivoting; and
wherein the cap is pivoted away from the valve body to engage the bar with the flange to bias the lock pin against the spring and out of engagement with the groove.

13. A valve comprising:
a valve assembly, comprising:
   a valve body including an exterior and an interior, and extending between a proximal end and a distal end, wherein the proximal end includes a circular opening;
   a guide extending from the valve body into the interior of the valve body and terminating at an elongated sleeve;
   wherein the sleeve extends between a proximal end and a distal end;
   a longitudinal bore within the sleeve extending between the proximal end and the distal end;
   a longitudinal bore within the guide extending between a first port at the valve body exterior and a second port at the sleeve bore;
   a disk-shaped sealing member for sealing the proximal end of the valve body;
   an elongated stem extending between a proximal end and a distal end, wherein the proximal end is connected to the sealing member;
   wherein the distal end of the stem is received within the sleeve bore;
   an insert including a threaded body and a head, wherein the body is threadably received within the distal end of the stem;
   a nut threadably mounted on the insert body, wherein the distal end of the nut is a contact surface;
a lock assembly, comprising:
   a lock pin disposed within the guide bore, comprising:
a lower pin portion;
a middle pin portion;
an upper pin portion;
a lock pin bore extending between the top of the lock pin through the upper portion, terminating within the middle pin portion;
a port extending between the lock pin bore and the exterior of the middle pin portion;
   a first seal disposed above the port for creating a sealing relationship between the lock pin and the guide bore;
   a second seal disposed below the port for creating a sealing relationship between the lock pin and the guide bore;
   a spring for biasing the lock pin into engagement with the contact surface;
   a cap disposed over an upper portion of the lock pin, wherein the cap is pivotally attached to the valve body by a pivot pin;
   a bar disposed within the cap for biasing against the lock pin; and
   wherein the cap is pivoted away from the valve body to engage the bar with the lock pin to bias the lock pin against the spring and out of engagement with the groove.

14. The valve of claim 13, further comprising a safety pin removably securing the cap to the valve body for preventing the cap from pivoting.

15. The valve of claim 13, wherein the first and second seals are O-rings.

* * * * *